(12) United States Patent
Molstad et al.

(10) Patent No.: US 7,079,343 B2
(45) Date of Patent: Jul. 18, 2006

(54) TIME-BASED SECTORED SERVO DATA FORMAT

(75) Inventors: Richard W. Molstad, St. Paul, MN (US); Douglas W. Johnson, Stillwater, MN (US); Durkee B. Richards, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/894,326

(22) Filed: Jul. 19, 2004

(65) Prior Publication Data

US 2005/0073763 A1    Apr. 7, 2005

Related U.S. Application Data

(62) Division of application No. 09/906,378, filed on Jul. 16, 2001, now Pat. No. 6,781,778.

(51) Int. Cl.
    G11B 5/09    (2006.01)
    G11B 5/584   (2006.01)
    G11B 5/55    (2006.01)
(52) U.S. Cl. .................. 360/51; 360/77.12; 360/77.07; 360/78.02
(58) Field of Classification Search ...................... None
    See application file for complete search history.

(56) References Cited

U.S. PATENT DOCUMENTS

| | | | |
|---|---|---|---|
| 3,665,118 A | 5/1972 | Cooper, Jr. | |
| 3,686,649 A | 8/1972 | Behr | |
| 4,007,493 A | 2/1977 | Behr et al. | |
| 4,149,198 A | 4/1979 | Behr et al. | |
| 4,321,634 A | 3/1982 | Lehureau | |
| 4,347,534 A | 8/1982 | Kimura | |
| 4,454,549 A | 6/1984 | Pennington | |
| 4,472,750 A | 9/1984 | Klumpp et al. | |
| 4,498,129 A | 2/1985 | Velazquez | |
| 4,549,232 A | 10/1985 | Axmear et al. | |
| 4,586,094 A | 4/1986 | Chambors et al. | |
| 4,587,579 A | 5/1986 | Cocke et al. | |
| 4,598,327 A | 7/1986 | Jen et al. | |
| 5,003,412 A | 3/1991 | Bizjak et al. | |
| 5,055,951 A | 10/1991 | Behr | |
| 5,119,248 A | 6/1992 | Bizjak et al. | |
| 5,132,861 A | 7/1992 | Behr et al. | |
| 5,210,660 A | 5/1993 | Hetzler | |
| 5,223,994 A | 6/1993 | Behr et al. | |
| 5,293,281 A | 3/1994 | Behr et al. | |
| 5,689,384 A | 11/1997 | Albrecht et al. | |
| 5,930,065 A * | 7/1999 | Albrecht et al. | 360/72.2 |
| 5,995,315 A | 11/1999 | Fasen | |
| 6,021,013 A | 2/2000 | Albrecht et al. | |
| 6,111,719 A * | 8/2000 | Fasen | 360/73.04 |
| 6,154,330 A | 11/2000 | Nakagawa | |
| 6,169,640 B1 | 1/2001 | Fasen | |
| 6,542,325 B1 | 4/2003 | Molstad et al. | |
| 6,574,066 B1 * | 6/2003 | Stubbs et al. | 360/77.03 |
| 6,580,581 B1 * | 6/2003 | Bui et al. | 360/78.02 |
| 6,700,729 B1 * | 3/2004 | Beck et al. | 360/76 |
| 2004/0105188 A1 * | 6/2004 | Dugas | 360/125 |

* cited by examiner

*Primary Examiner*—Andrew L. Sniezek
(74) *Attorney, Agent, or Firm*—Eric D. Levinson

(57) ABSTRACT

The invention combines the benefits of sectored servo data with the benefits of time-based servo data. Recording media such as magnetic tape, magnetic disks, optical tape and optical disks can store servo data in a time-based sectored servo format.

8 Claims, 7 Drawing Sheets

TIME-BASED SECTORED SERVO DATA FORMAT

This application is a divisional application of U.S. application Ser. No. 09/906,378 filed Jul. 16, 2001 now U.S. Pat. No. 6,781,778, which is incorporated herein by reference in its entirety.

TECHNICAL FIELD

The invention relates to data storage media and, in particular, to recording and reading from magnetic and optical storage media.

BACKGROUND

Storage media are used for storage and retrieval of data, and come in many forms, such as magnetic tape, magnetic disks, optical tape and optical disks. For most media, a head assembly, which includes one or more read transducer heads, reads data from the storage medium. Many forms of media, such as magnetic tape and rewritable optical disks, allow data to be written to the medium as well as read from the medium. A write transducer head or a read/write transducer head writes data to the storage medium.

The data stored on the medium are usually organized into "data tracks," and the transducer heads write data to and/or read data from the data tracks. A typical storage medium includes several data tracks.

As the number of data tracks on a medium increases, the data storage capacity of the medium increases. The data tracks also usually become narrower, as more data tracks are crowded onto the recording surface of the medium.

For proper data storage and recovery, the transducer head must locate each track where data are to be written or read, and follow the path of the data track accurately along the media surface. A servo controller typically is provided to control the positioning of the head relative to the data tracks.

Earlier servo controllers positioned the heads relative to the expected position of the medium as the medium passed the head. Other servo controllers measured the position of a data track relative to an edge of the recording medium. As more and narrower data tracks were added to media, however, these methods of locating data tracks became less satisfactory and were not able to support the precision needed for head placement.

A more modern approach was to place, during the medium manufacturing process, pre-recorded servo position information at pre-selected sites on the medium. This servo position information was then used by the servo controller to control head motion when seeking between tracks, and to regulate head position on a track during reading and/or writing.

With some forms of storage media such as magnetic tape, the servo information is stored in specialized tracks in the medium, called "servo tracks." Servo tracks serve as references or landmarks for the servo controller. Servo tracks hold no data except for information that is useful to the servo controller.

The servo tracks are sensed by a servo read head. A servo read head may be a dedicated head that reads only servo tracks and does not read data tracks. Once a particular servo track is located by the servo read head, a data track can be located on the medium according to the data track's displacement from the servo track.

Other forms of storage media, such as magnetic disks, store servo information in one or more specialized sectors. In a magnetic disk, for example, servo information may be recorded in a single sector that extends from the outer circumference of the disk to the inner circumference, or may be recorded in multiple zones or wedges. The servo controller uses the information stored in the servo portion of each sector first to locate the desired track and then to appropriately position the transducer head with respect to the centerline of the desired track.

SUMMARY

The present invention combines the benefits of sectored servo data with the benefits of time-based servo data. A wide variety of forms of storage media can store servo data in a time-based sectored servo format. In particular, magnetic tape, magnetic disks, optical tape and optical disks can store servo data in a time-based sectored servo format.

Servo data stored in a time-based format are arranged in a different way than servo data stored in a conventional format. In magnetic media, for example, conventional servo tracks may store magnetic flux transitions of varying phases or frequencies. Time-based servo tracks apply a different approach, storing servo data in a series of patterns. A simple form of a pattern consists of a pair of marks. The marks are not coincident with each other, nor are the marks parallel. Rather, the marks are angularly offset from one another, in a pattern such as a diamond or zigzag.

As a servo read head reads a time-based servo track, the servo read head generates a signal when encountering each of the marks. The time between the signals is indicative of the lateral location of the servo read head relative to the servo marks, due to the angular offset between the marks. The timing of the signals varies continuously as the servo read head is moved laterally across the width of the pattern.

The timing of signals generated by the servo read head is decoded by appropriate circuitry. The decoder circuitry can determine from the timing of the signals whether the servo read head is reading near an edge of the servo pattern, for example, or whether the servo read head is reading in the center of the servo pattern.

The time-based servo patterns are arranged in sectors that intersect one or more data tracks. Dedicated servo tracks on the medium are not required. The sectored format potentially uses less space on the medium than conventional servo information formats. In many embodiments, the format may be read by a data transducer head, and consequently the head assembly does not require a dedicated servo read head.

In one embodiment, the invention presents a medium for recording data. The medium includes a data track extending in a longitudinal direction and a time-based servo pattern adjacent to the data track in the longitudinal direction. A transducer head tracking the data track in the longitudinal direction encounters and senses a time-based servo pattern. A servo controller uses signals from the transducer head to control a head actuator, which moves the transducer head proximate to a particular data track or adjusts for tracking errors.

In a typical implementation, the data track may be one of a group of data tracks, and the width of the time-based servo pattern in the lateral direction, which is perpendicular to the longitudinal direction, is substantially equal to the width of the group of data tracks in the lateral direction. The medium may include magnetic tape, a magnetic disk, optical tape and an optical disk.

In another embodiment, the invention presents a method comprising performing a coarse adjustment of the position of a transducer head relative to a recording medium, sensing a time-based servo pattern on the recording medium with the transducer head and performing a fine adjustment of the position of a transducer head relative to a recording medium as a function of the sensed time-based servo pattern. A system implementing this method may employ a head actuator and a servo controller that cooperate to bring the transducer head proximate to the desired data track.

The method may also include commencing a timing interval and writing to a data track on the recording medium during the timing interval. In addition, the method may include suspending writing to a data track when the timing interval expires. In this manner, a transducer head that is writing to a data track in the medium will be less likely to overwrite a time-based servo pattern.

In a further embodiment, the invention presents a system. The system comprises a transducer head that reads data from data tracks on a recording medium, a servo controller and a head actuator. The servo controller and head actuator perform a coarse adjustment of the position of the transducer head relative to the recording medium. The servo controller and the head actuator cooperate to perform a fine adjustment of the position of the transducer head as a function of a servo pattern sensed by the transducer head.

In an additional embodiment, the invention presents a recording medium having a servo pattern. The servo pattern comprises a first servo line, a second servo line and a third servo line. The first servo line is a substantially straight line, the second servo line is a substantially straight line and parallel to the first servo line, and the third servo line is not parallel to the first servo line and the second servo line. The invention also presents a device that can record such a servo pattern on a magnetic recording medium.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
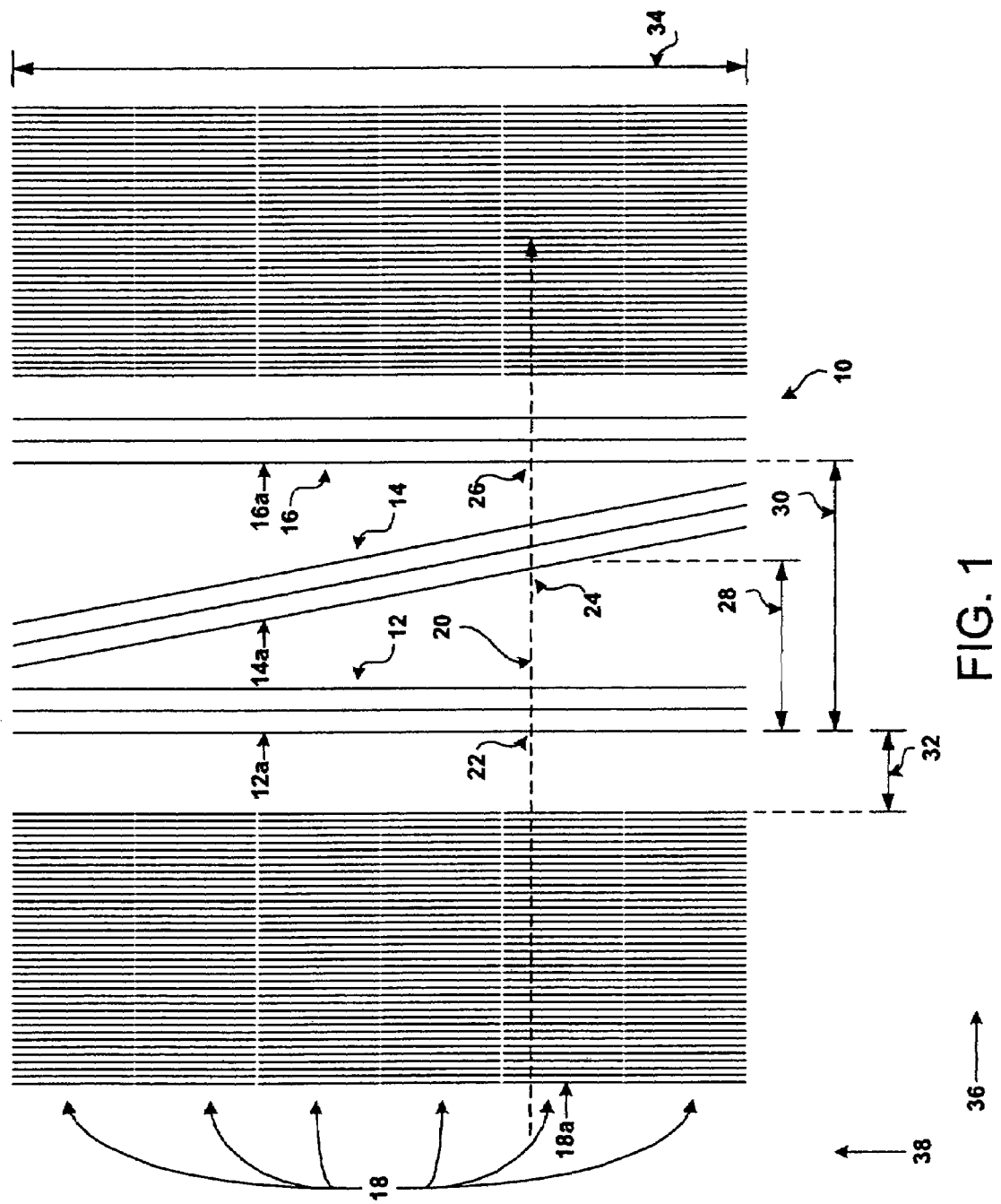
FIG. 1 illustrates a time-based servo pattern.

FIG. 1 depicts an exemplary time-based servo pattern 10 on a recording medium that may be used in an implementation of the present invention. Pattern 10 is typically written to the recording medium at the time of manufacture.

A time-based servo pattern such as pattern 10 includes servo lines or servo line sets that encode position-related data. On a magnetic medium, the servo lines in pattern 10 may be formed as magnetic flux transitions that may be detected magnetically. On an optical or magnetic medium, the servo lines in pattern 10 may be formed as physical marks on the medium, and these marks may be detected optically.

On either side of servo pattern 10 are data tracks 18. As shown in FIG. 1, width 34 of servo pattern 10 is equal to the width of six data tracks 18. A typical width 34 is 250 μm. Servo pattern 10 may adapted for use with more or fewer data tracks, or with a larger or smaller width.

Data tracks 18 are written in a first reference direction, which will be referred to as the longitudinal direction, identified by reference numeral 36. Longitudinal direction 36 is typically parallel to the direction of velocity of the medium past a transducer head, whether the medium is magnetic tape, optical tape, a magnetic disk or an optical disk. Reference numeral 38 identifies a second reference direction, the lateral direction, which is perpendicular to longitudinal direction 36.

Notably, servo pattern 10 is adjacent to data tracks 18 in longitudinal direction 36. In other words, servo pattern 10 "cuts across" data tracks 18. As a result, a transducer head that reads a particular data track in longitudinal direction 36 will at some point encounter servo pattern 10. As will be shown below, this arrangement of servo pattern 10 adjacent to data tracks 18 allows for fine adjustments of the position of the transducer head.

Servo pattern 10 includes a first servo line 12a, a second servo line 16a and a third servo line 14a. First servo line 12a and second servo line 16a are substantially straight lines and parallel to each other. Third servo line 14a is not parallel to first servo line 12a and second servo line 16a. Third servo line 14a is substantially straight and is disposed between first servo line 12a and second servo line 16a, creating a substantially N-shaped pattern.

As shown in FIG. 1, servo pattern 10 is composed of three servo line sets 12, 14 and 16. Servo line set 12 comprises three parallel servo lines, including first servo line 12a. Similarly, servo line set 16 comprises three parallel servo lines, including second servo line 16a, and servo line set 14 comprises three servo lines, including servo line 14a. Servo line sets 12 and 16 are parallel to each other. Consequently, the distance between servo line sets 12 and 16 is constant along the width 34 of servo pattern 10. As shown in FIG. 1, servo line sets 12 and 16 are also substantially oriented in lateral direction 38.

Servo line set 14, disposed between servo line sets 12 and 16, is not parallel to servo line sets 12 and 16. Rather, servo line set 14 is angled between servo line sets 12 and 16. Consequently, the distance between servo line set 12 and servo line set 14 is not constant along the width 34 of servo pattern 10, and the distance between servo line set 16 and servo line set 14 is not constant along the width 34 of servo pattern 10.

Servo line sets 12, 14 and 16 are each composed of three separate servo lines. A time-based servo pattern may include multiple servo lines to improve the quality of the signal that results when the pattern is sensed. In theory, pattern 10 could function with single servo lines 12a, 14a and 16a. The invention is not limited to patterns having servo line sets of three servo lines, but may be adapted to servo line sets having any number of servo lines.

Servo line set 12 may be separated from data tracks 18 by speed buffer gap 32. Speed buffer gap 32 is an unrecorded region on the medium, holding no data or servo information. As will be described below, speed buffer gap 32 may protect servo pattern 10 during writing operations. Ideally, speed buffer gap 32 has a constant width in longitudinal direction 36, is depicted in FIG. 1. In practice, however, the width of speed buffer gap 32 may vary from data track to data track and from servo pattern to servo pattern. Speed buffer gap 32 may have an average width of about 70 μm.

Reference numeral 20 identifies an arbitrary path of a transducer head relative to the medium. The transducer head reads data from data track 18a. At some point, the transducer head encounters a region of the medium in which no data are present, as the transducer head passes over speed buffer gap 32. The transducer head then encounters servo line set 12 at point 22. When the transducer head encounters servo line set 12, the transducer head may generate a signal, such as a voltage signal. In a magnetic medium, for example, a transducer head encountering servo line set 12 may generate three cycles of voltage, one for each servo line in servo line set 12.

The medium and the transducer head then move relative to each other at a substantially constant speed until the transducer head encounters servo line set 14 at point 24. When the transducer head encounters servo line set 14, the transducer head may generate a second signal.

The medium and the transducer head then moves relative to each other at a substantially constant speed until the transducer head encountered servo line set 16 at point 26. The transducer head may generate a third signal upon encountering servo line set 16.

Because the medium and the transducer head move relative to each other at a substantially constant speed, the time between signals is directly proportional to the distance between servo line sets at points 22, 24 and 26. The time between the first signal and the second signal is proportional to variable distance 28, and the time between the first signal and the third signal is proportional to reference distance 30.

Variable distance 28 increases or decreases depending upon the lateral position of the transducer head, but reference distance 30 is constant. Reference distance 30 is also a known quantity. Therefore, the ratio of variable distance 28 to reference distance 30 is a function of the lateral position of the transducer head. Furthermore, because the time between signals is proportional to distance, the ratio of the time between the first signal and the second signal to the time between the first signal and the third signal is also a function of the lateral position of the transducer head.

As will be described below, signal decoder 68 (see FIG. 4) receives the first, second and third signals and derives the lateral position of the transducer head based upon the timing of the signals. Signal decoder 68 may further generate a position signal, such as a position error signal representing the difference between the ideal position of the transducer head and the actual position of the transducer head. Servo controller 66 cooperates with head actuator 64 (see FIG. 4) to bring the transducer head proximate to the desired data track.

Servo pattern 10 offers numerous advantages. First, the time-based ratio described above is proportional to the lateral position of the transducer head without regard to the speed of the medium relative to the transducer head. As a result, the time-based ratio will be the same for a given lateral position if the medium moves relative to the transducer head at a substantially constant speed.

Servo pattern 10 also offers the advantages of being self-contained and unambiguous. The time between an encounter with servo line set 12 and an encounter with servo line set 14, when compared with the time between an encounter with servo line set 12 and an encounter with servo line set 16, is determinative of the lateral position of the transducer head. Servo pattern 10 is self-contained because the lateral position of the transducer head can be determined by the time-based ratio without resort to detection of any other servo marks. Servo pattern 10 is unambiguous because each time-based ratio is uniquely mapped to a lateral transducer head position.

Another advantage of servo pattern 10 is that it can consume less space on the medium recording surface than a servo track. This will be described in more detail below in connection with FIGS. 2 and 3.

A further advantage of servo pattern 10 is that servo pattern 10 may be sensed by the same transducer head that is used to read data from or write data to data tracks 18. As a consequence, a head assembly does not require any dedicated servo read heads. Not only does this simplify construction of the head assembly, but lateral positioning of each transducer head in the head assembly is also facilitated. The actual lateral position of the transducer head may be sensed and adjusted directly, rather than sensed and adjusted relative to the position of a dedicated servo head.

Figure 2:
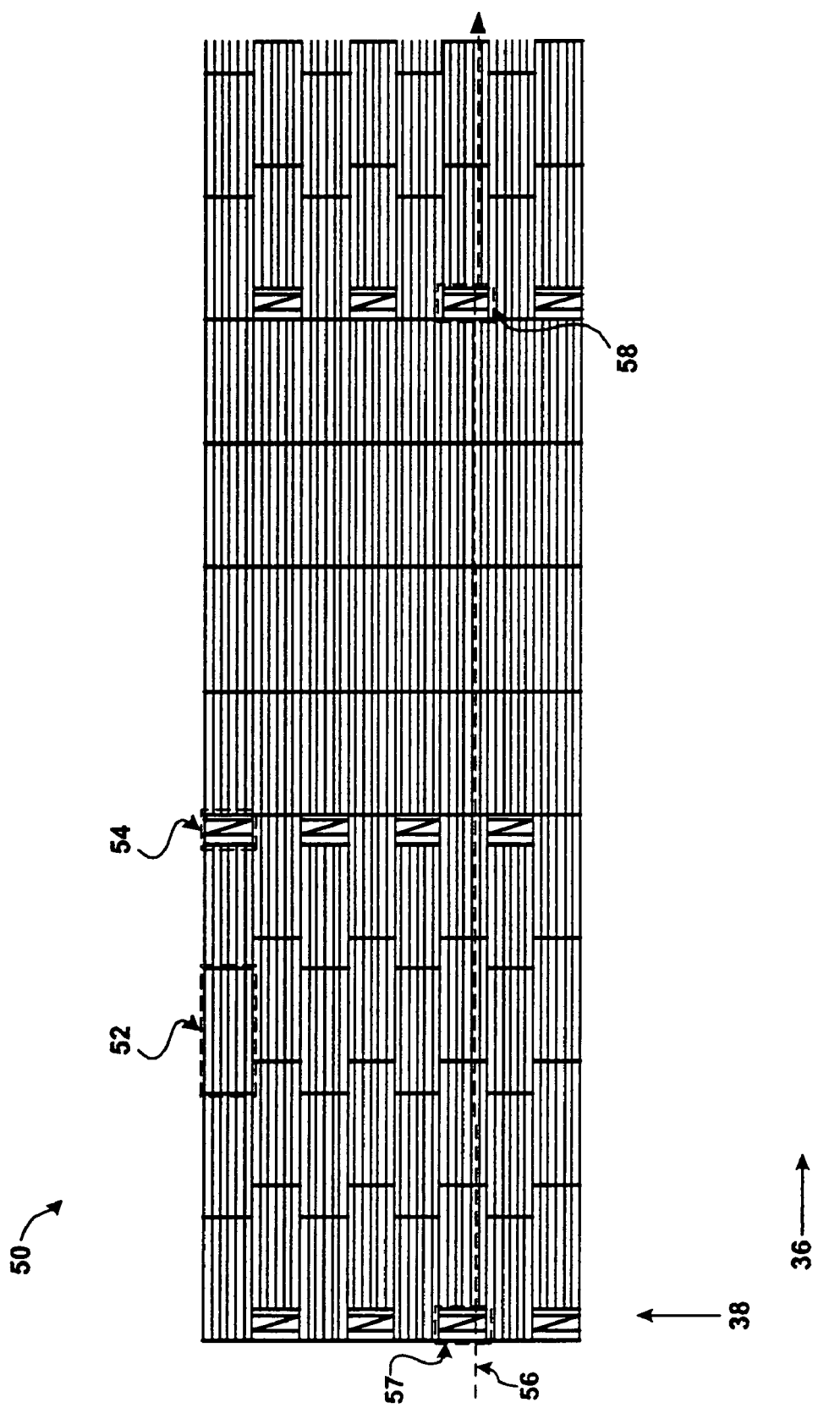
FIG. 2 shows a media format, including time-based servo patterns.

FIG. 2 shows format 50 of data and time-based servo patterns on a medium that records data. Format 50 includes a plurality of time-based servo patterns, such as servo pattern 10 shown in FIG. 1. An exemplary servo pattern is identified with reference numeral 54. Format 50 also includes data tracks arranged in groups, with six data tracks per group and each data track in the group having a particular length and/or data storage capacity. A group with six data tracks is identified with reference numeral 52. As in FIG. 1, each time-based servo pattern in format 50 is of the same width as a group of six data tracks.

The data tracks and groups extend in longitudinal direction 36. Time-based servo patterns are adjacent to the data tracks and the groups in longitudinal direction 36. In other words, the data tracks are interrupted by time-based servo patterns, which are distributed among the data tracks. The sectors of servo information in format 50 are spaced apart, i.e., no time-based servo pattern abuts another in lateral direction 38. Typically, the time-based servo patterns are distributed periodically among the data tracks. As illustrated in FIG. 2, time-based servo patterns appear every eight groups.

Notably, format 50 includes no servo tracks. Instead, the servo data are sectored, i.e., the servo data are contained in the time-based servo patterns. Servo data sectored in time-based servo patterns may take less space than servo data in a dedicated servo track, thereby having the potential to free more space on the medium for the recording of data.

Servo controller 66 and head actuator 64 use the sectored servo data to laterally position the transducer head proximal to a desired data track and to adjust for tracking errors. This is illustrated by path 56 of a transducer head reading data from the medium. The transducer head encounters first servo pattern 57. Based upon the timing of signals generated upon encountering servo pattern 57, servo controller 66 and head actuator 64 position the transducer head laterally to read data from a desired data track.

After reading the data track over eight groups, the transducer head encounters second servo pattern 58. Based upon the timing of signals generated upon encountering second servo pattern 58, servo controller 66 and head actuator 64 adjust the lateral position of the transducer head to re-orient the transducer head relative to the desired data track. In this manner, the time-based servo patterns distributed laterally along the desired data track permit servo controller 66 and head actuator 64 not only to locate a desired track but also to continually correct for tracking errors.

In practical application, several transducer heads may be part of a head assembly, with each transducer head reading data from the medium simultaneously. Each transducer head may receive servo data from a time-based servo pattern. Because the time-based servo patterns are spaced apart in lateral direction 38, transducer heads in the head assembly may encounter time-based servo patterns at different times. As a result, lateral corrections of the positions of the transducer heads and the head assembly may be made more frequently, with each encounter of a time-based servo pattern.

For example, as one transducer head follows illustrative path 56, a correction may be made after encountering servo pattern 57. Another correction may be made when a second transducer head in head assembly encounters servo pattern 54. A further correction may be made when the first transducer head encounters servo pattern 58.

Figure 3:
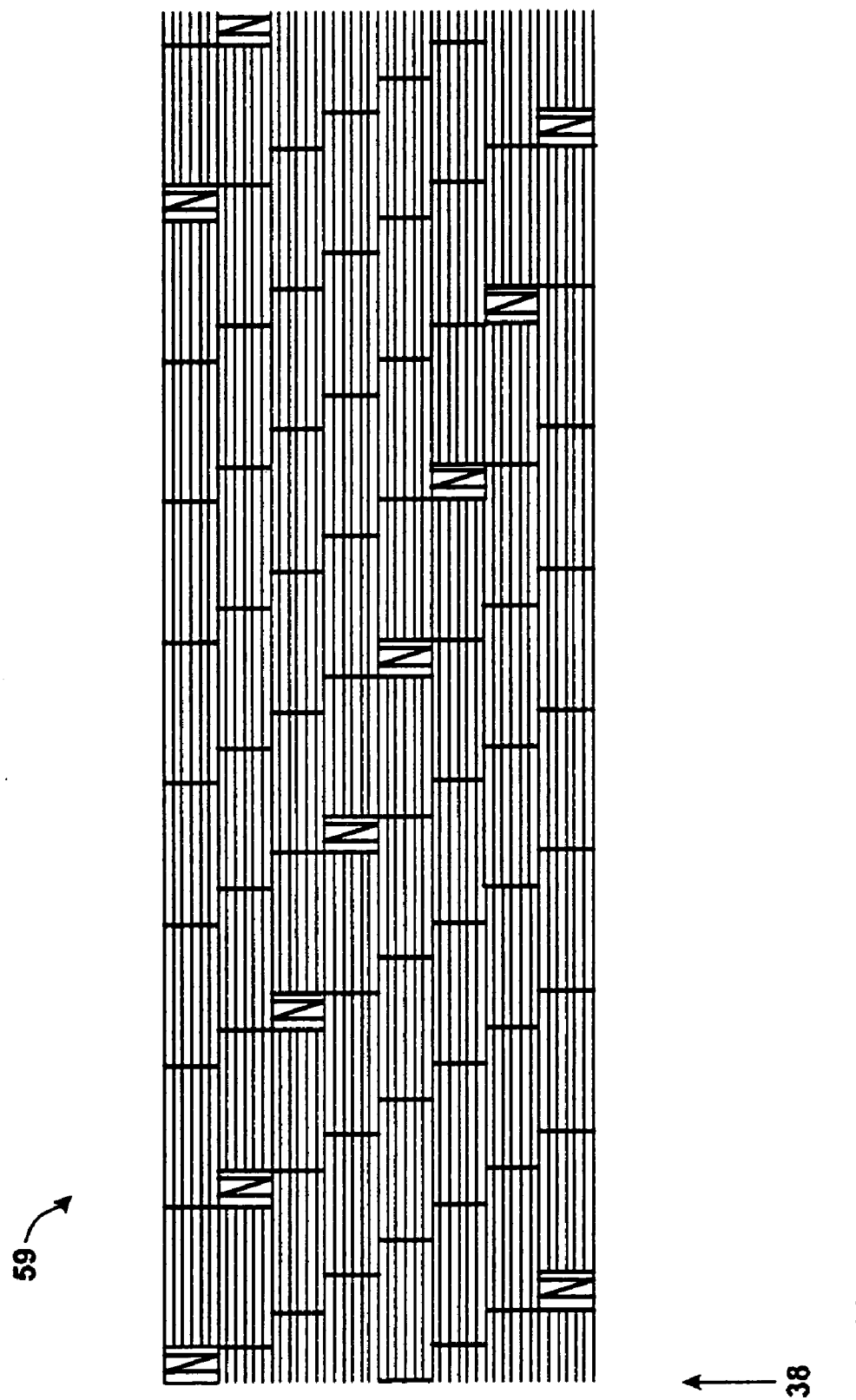
FIG. 3 shows an alternate media format, including time-based servo patterns.

FIG. 3 illustrates an alternate format 59. Format 59 is similar to format 50 in that the data tracks and groups extend in longitudinal direction 36, the time-based servo patterns are adjacent to the data tracks and the groups in longitudinal direction 36, and time-based servo patterns appear every eight groups. The frequency of servo patterns in longitudinal direction 36 is higher in format 59 than in format 50, however, allowing more frequent corrections to be made.

Formats 50 and 59 shown in FIGS. 2 and 3 are merely a representative formats that may be duplicated on a much larger scale on a recording medium. A recording medium may include more data tracks, groups and time-based servo patterns than are shown in FIGS. 2 and 3. Time-based servo patterns may be distributed among groups in ways other than shown in FIGS. 2 and 3. Moreover, the formats illustrated in FIGS. 2 and 3 are not limited to straight data tracks, but can be adapted for curved data tracks, such as are found on magnetic or optical disks.

Figure 4:
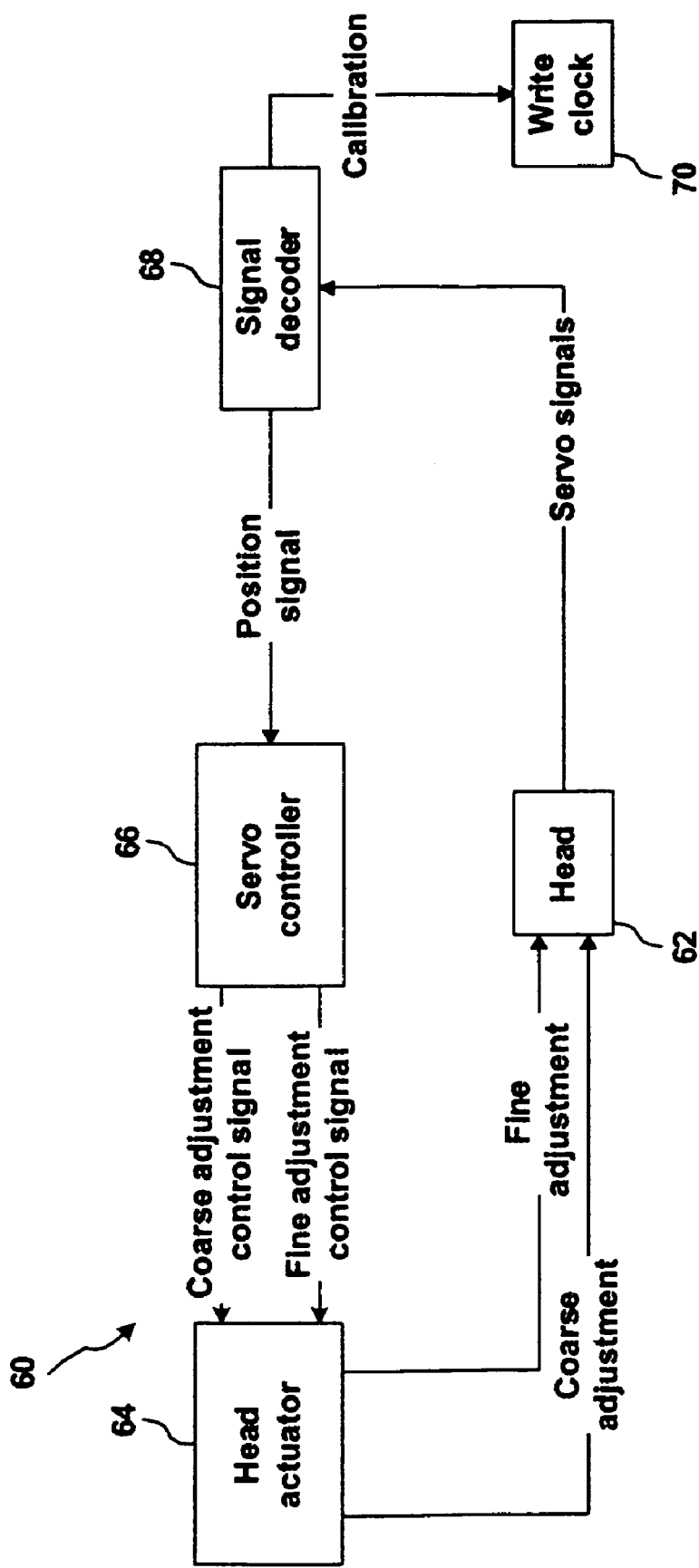
FIG. 4 is a block diagram of a transducer head positioning system.

FIG. 4 is a block diagram showing transducer head positioning system 60. Head positioning system 60 includes head actuator 64, which positions transducer head 62. Head actuator 64 is controlled by servo controller 66.

Without servo information from servo patterns, head actuator 64 and servo controller 66 ordinarily cannot position transducer head 62 precisely. Head actuator 64 and servo controller 66 ordinarily can, however, provide a coarse adjustment of the lateral position of transducer head 62 relative to a medium. A coarse adjustment is typically accurate enough to bring transducer head 62 proximate to the group that includes the desired data track, but not accurate enough to bring transducer head 62 proximate to the desired data track itself.

Once transducer head 62 is proximate to the group that includes the desired data track, transducer head 62 continues to move relative to the medium until transducer head 62 encounters a time-based servo pattern. When the pattern is encountered, transducer head 62 generates servo signals that are received by signal decoder 68. Signal decoder 68 receives the servo signals and derives the lateral position of transducer head 62 based upon the timing of the signals.

When encountering a time-based servo pattern 10, for example, signal decoder 68 receives a first signal, a second signal and a third signal from transducer head 62. Signal decoder 68 measures the time between the first signal and the second signal, and the time between the first signal and the third signal. The ratio of these measured times is a function of the lateral position of transducer head 62.

Signal decoder 68 generates a position signal as a function of the lateral position of transducer head 62. Servo controller 66 receives the position signal and cooperates with head actuator 64 to adjust the lateral position of transducer head 62. Based upon signals from servo controller 66, head actuator 64 performs a fine positioning adjustment, bringing transducer head 62 proximate to the desired data track.

The signal generated by signal decoder 68 may, for example, a position error signal representing the difference between the ideal position of transducer head 62 and the actual position of transducer head 62. Alternatively, the signal generated by signal decoder 68 may be an absolute position signal.

Signal decoder 68 may be coupled to write clock 70. As described above, signal decoder 68 measures the time between the first signal and the third signal, which is proportional to reference distance 30 and is independent of the lateral position of transducer head 62. This reference time may be supplied as a calibration signal to write clock 70, which may then compute the time at which the next time-based servo pattern will be encountered. Write clock 70 may be used while writing data to the medium, as will be described in more detail below in connection with FIG. 6.

Figure 5:
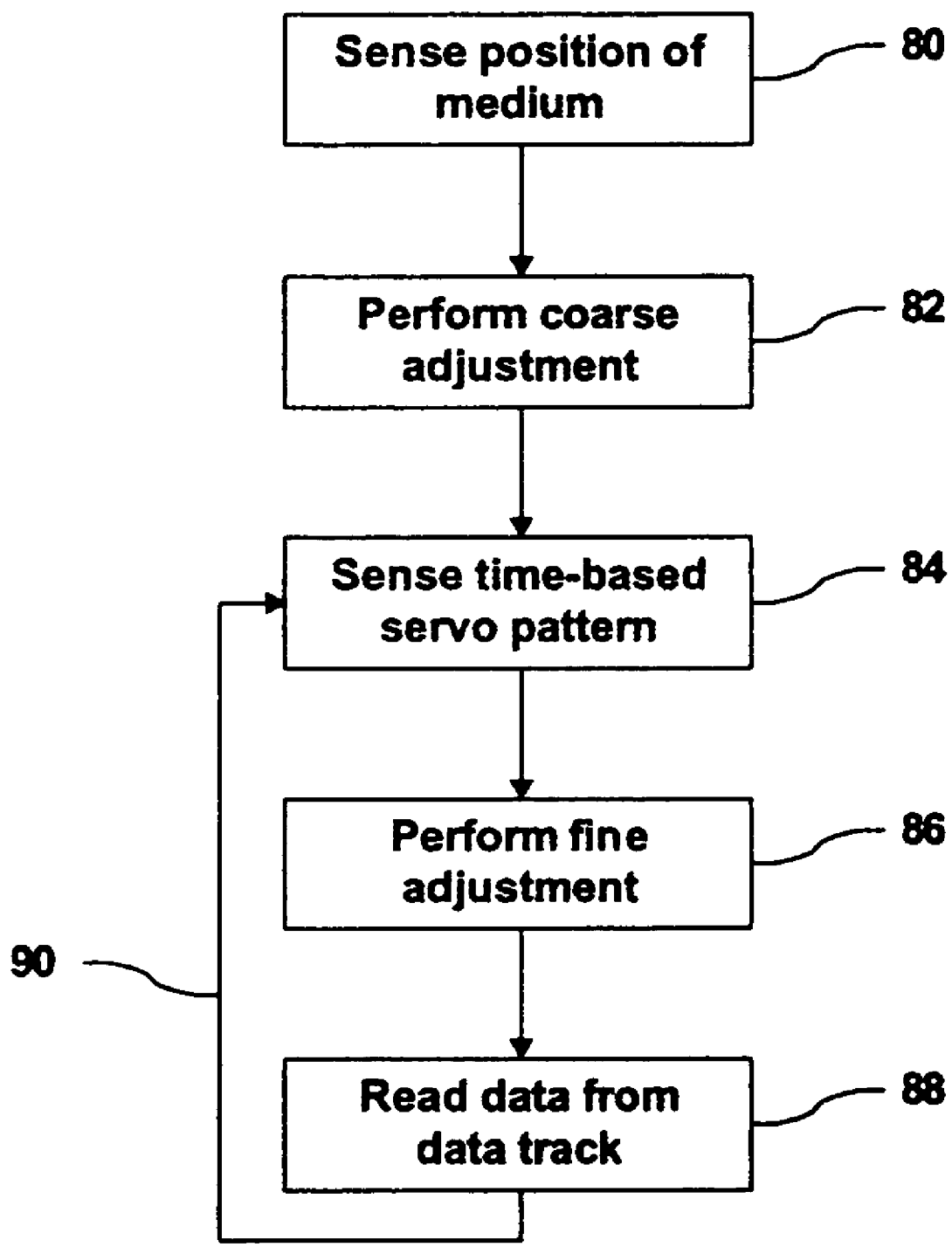
FIG. 5 is a flow diagram showing techniques for reading data from media having time-based sectored servo data.

A method for positioning transducer head 62 and reading data from a recording medium is shown in FIG. 5. Head actuator 64 and servo controller 66 perform a coarse adjustment of the lateral position of transducer head 62 relative to a medium (82). Optionally, head actuator 64 and servo controller 66 may perform coarse adjustment (82) as a function of a sensed position of the medium (80). An edge detector, for example, may sense the edge of the medium and may provide servo controller 66 with medium position data that assists with coarse positioning of transducer head 62. It is also possible that servo controller 66 and head actuator 64 may be able to perform coarse adjustment without such position data.

Following coarse adjustment (82), transducer head 62 is proximate to the group that includes the desired data track. Transducer head 62 then senses a time-based servo pattern (84) and generates servo signals, which are processed by signal decoder 68, servo controller 66 and head actuator 64 to perform fine adjustments to the lateral position of transducer head 62 (86). Once fine adjustments are made, transducer head 62 reads data from the desired data track (88).

After reading some data from the data track, transducer head 62 may encounter another time-based servo pattern (90). Transducer head 62 senses this servo pattern (84), and the lateral position of transducer head 62 may again be adjusted (86) to correct for tracking errors.

Some storage media, such as magnetic tape and rewritable optical disks, allow the recording of original data, and also allow new data to be recorded over the original data, thereby obliterating the original data. Because a transducer head writing to a data track in the longitudinal direction will encounter a time-based servo pattern, it is desirable that the writing head not obliterate the time-based servo pattern in the process. It is also desirable that the time-based servo pattern be sensed during a writing operation so that servo controller 66 may correct for tracking errors.

Accordingly, it is desirable to configure transducer head 62 to perform writing and reading operations. For some forms of storage media, a single transducer head can operate in a write mode and in a read mode. A transducer head that writes information magnetically on magnetic tape or a magnetic disk, for example, can typically read the information as well.

For other forms of storage media, separate transducer heads may be dedicated to each mode of operation. In such a case, one or more read heads may sense the servo patterns on a medium, and the position of the read heads may be ascertained. A write head may then be positioned proximate to a data track based upon the known lateral displacement between the read heads and the write head.

Figure 6:
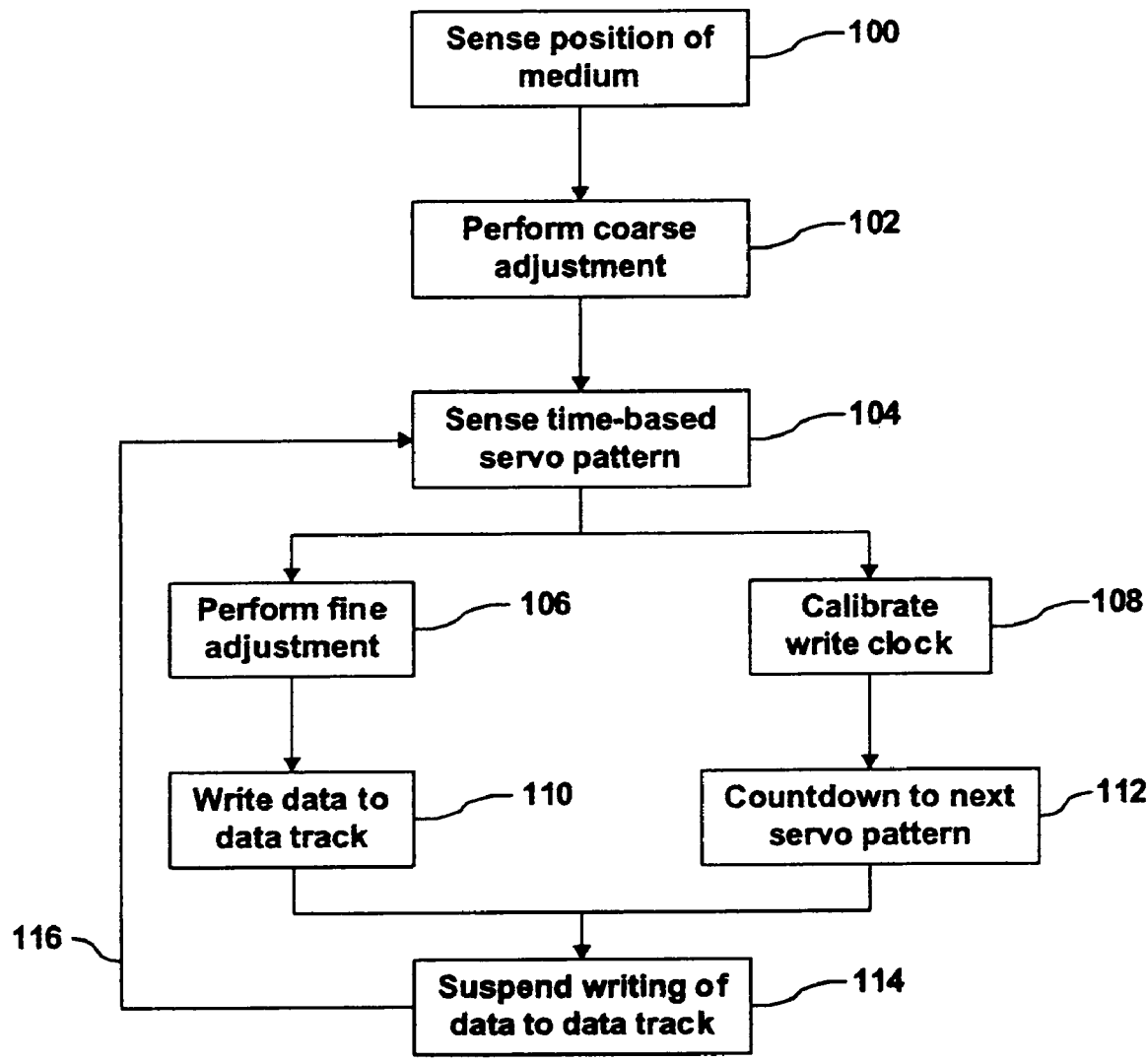
FIG. 6 is a flow diagram showing techniques for writing data to media having time-based sectored servo data.

A method for positioning transducer head 62 and writing data to a recording medium is shown in FIG. 6. For purposes of discussing FIG. 6, it is assumed that transducer head 62 can operate in either read mode or write mode. The position of the medium may be sensed (100) and servo controller 66 and head actuator 64 may perform a coarse adjustment of the lateral position of transducer head 62 (102) to bring transducer head 62 proximal to the desired group. Transducer head 62 then senses a time-based servo pattern (104).

After the time-based servo pattern is sensed, the time measurements performed by signal decoder 68 may be used to calibrate write clock 70 (108). On the basis of the measurements, write clock 70 may accurately compute how much time will elapse before transducer head 62 will encounter the next time-based servo pattern. Write clock 70 begins to count down the time before the next time-based servo pattern will be encountered (112).

After the time-based servo pattern is sensed, servo controller 66 and head actuator 64 perform a fine positioning adjustment, bringing transducer head 62 proximate to the desired data track for writing (106), and writing operations may proceed (110). Writing operations may continue during the timing interval in which write clock 70 counts down, and may continue until shortly before an encounter with the next time-based servo pattern, as calculated by write clock 70. Before the next time-based servo pattern is encountered, writing operations are suspended (114). The techniques describe above may be repeated (116) until the writing operation is completed.

The calculated time of encounter with the next time-based servo pattern may include some error, due to variations of speed of the medium relative to the transducer head, or due to other factors. A time-based servo pattern that includes a speed buffer gap, such as speed buffer gap 32 in pattern 10 in FIG. 1, provides for a margin of error. Speed buffer gap 32 provides a small space cushion between the data track and servo line set 12. When a time-based servo pattern includes a speed buffer gap, there is a reduced probability of accidentally writing over the positional data encoded in the time-based servo pattern.

Figure 7:
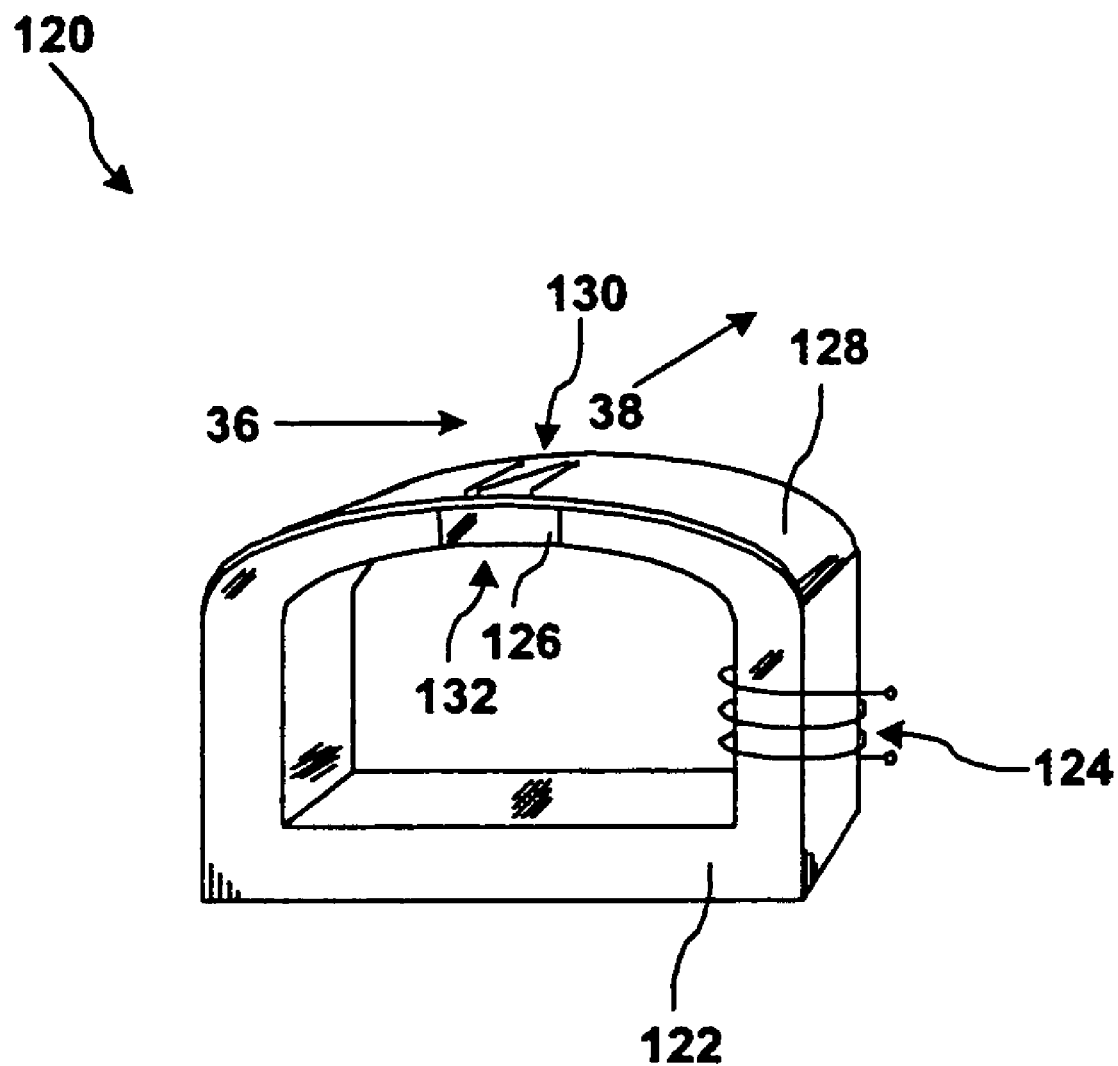
FIG. 7 is a perspective view of a magnetic write head.

As noted above, the time-based servo pattern may be recorded optically and/or magnetically. FIG. 7 shows a magnetic write head 120 that can magnetically record a time-based servo pattern such as pattern 10 shown in FIG. 1.

Magnetic write head 120 includes a C-shaped ferromagnetic core 122. Core 122 may be monolithically constructed as shown in FIG. 7, i.e., constructed from a single piece of ferromagnetic material. Core 122 has a core gap 132 that holds non-magnetic element 126. Non-magnetic element 126 may be composed of ceramic or other non-magnetic material, and may be glass-bonded, glued or otherwise affixed to core 122.

Magnetically permeable film surface 128 is proximate to core 122 and to non-magnetic element 126, and is typically affixed to core 122 and to non-magnetic element 126. Film surface 128 may be selected from many materials having a high wear tolerance and high magnetic moment density, such as iron nitride alloys. Alloys in this class can be applied by sputtering. The curvature of film surface 128 facilitates smooth contact between the magnetic medium and magnetic write head 120. Film 128, core 122 and/or non-magnetic element 126 may include other structures, such as slots (not shown in FIG. 7) to channel trapped air when the medium passes by magnetic write head 120 in longitudinal direction 36.

Flux gaps 130 have been formed in film surface 128. Flux gaps 130 are in a substantially N-shaped pattern, similar to pattern 10 shown in FIG. 1. In particular, flux gaps 130 include a first flux gap that is substantially in the shape of a straight line, a second flux gap is substantially in the shape of a straight line and parallel to the first flux gap and a third flux gap disposed between the first flux gap and the second flux gap. The third flux gap is not parallel to the first flux gap and the second flux gap.

In FIG. 7, flux gaps 130 are substantially composed of individual lines. Flux gaps 130 may also include line sets and may be very close in appearance to pattern 10 shown in FIG. 1.

Flux gaps 130, which penetrate through film surface 128, may be formed with great precision using photolithographic methods, a focused ion beam, or other techniques. Flux gaps 130 are proximate to non-magnetic element 126.

Coil 124, wound around core 122, energizes magnetic write head 120. Current flowing through coil 124 causes magnetic flux to be generated in core 122. Because of the high reluctance of non-magnetic element 126, little flux passes directly across core gap 132. Flux does, however, permeate through magnetically permeable film 128. As the magnetic flux flows through film 128, the flux "leaks out" through flux gaps 130. As a result, a magnetic field in the same pattern as flux gaps 130 is created, which is recorded as magnetic transitions on the magnetic medium. In this manner, time-based servo patterns may be recorded on a magnetic medium.

Magnetic write head 120 may extend further in lateral direction 38 than is depicted in FIG. 7, and may include additional sets of flux gaps (not shown in FIG. 7) in film surface 128. When energized, magnetic write head 120 may record more than one pattern simultaneously.

A number of embodiments of the present invention have been described. Nevertheless, various modifications may be made without departing from the scope of the invention. For example, the techniques described above may be adapted, for example, to magnetic tape that incorporates optically-detectable servo patterns.

Although the techniques above have been described in reference to servo pattern 10 shown in FIG. 1, the invention is not limited to servo pattern 10. Servo pattern 10 may be modified in many ways. For example, servo line set 14 may be angled in a different direction, or may be curved instead of straight. Other servo patterns different from servo pattern 10 may be used to hold sectored servo information. Furthermore, the format on a single medium may include more than one kind of time-based servo pattern.

In addition, time-based sectored servo information may be combined with other forms of servo information. For example, a medium may include a servo track in addition to time-based sectored servo information.

These and other embodiments are within the scope of the following claims.

The invention claimed is:

1. A method comprising:

performing a coarse adjustment of the position of a transducer head relative to a recording medium;

sensing a first time-based servo pattern on the recording medium with the transducer head;

performing a fine adjustment of the position of the transducer head relative to the recording medium as a function of the sensed first time-based servo pattern; and computing a time when the transducer head will encounter a second servo pattern based on the sensed first time-based servo pattern.

2. The method of claim 1, further comprising sensing the position of a recording medium.

3. The method of claim 1, further comprising reading from a data track on the recording medium.

4. The method of claim 1, further comprising:

commencing a timing interval based on the computed time when the transducer head will encounter the second servo pattern; and writing to a data track on the recording medium during the timing interval, wherein the data track is between the first and second time-based servo patterns.

5. The method of claim 4, further comprising suspending writing to a data track when the timing interval expires.

6. A system comprising:

a transducer head that reads data from data tracks on a recording medium;

a head actuator that positions the transducer head relative to the recording medium; and a servo controller that controls the head actuator;

wherein the servo controller and head actuator cooperate to perform a coarse adjustment of the position of the transducer head relative to a data track, and wherein the servo controller and head actuator cooperate to perform a fine adjustment of the position of the transducer head relative to the data track as a function of a time-based servo pattern sensed by the transducer head, and wherein the servo pattern is a first servo pattern, the system further comprising a write clock that computes, as a function of the first servo pattern sensed by the transducer head, the time when the transducer head will encounter a second servo pattern.

7. The system of claim 6, further comprising a signal decoder that receives signals generated by the transducer head as a function of sensed servo pattern and derives the lateral position of the transducer head relative to the medium based upon the timing of the signals.

8. The system of claim 7, wherein the signal decoder further generates a position error signal as a function of the difference between the derived lateral position of the transducer head from the ideal lateral position of the transducer head.

* * * * *